J. T. JONES.
PROCESS OF REDUCING IRON FROM THE ORE.
APPLICATION FILED DEC. 20, 1917.
1,379,024.
Patented May 24, 1921.
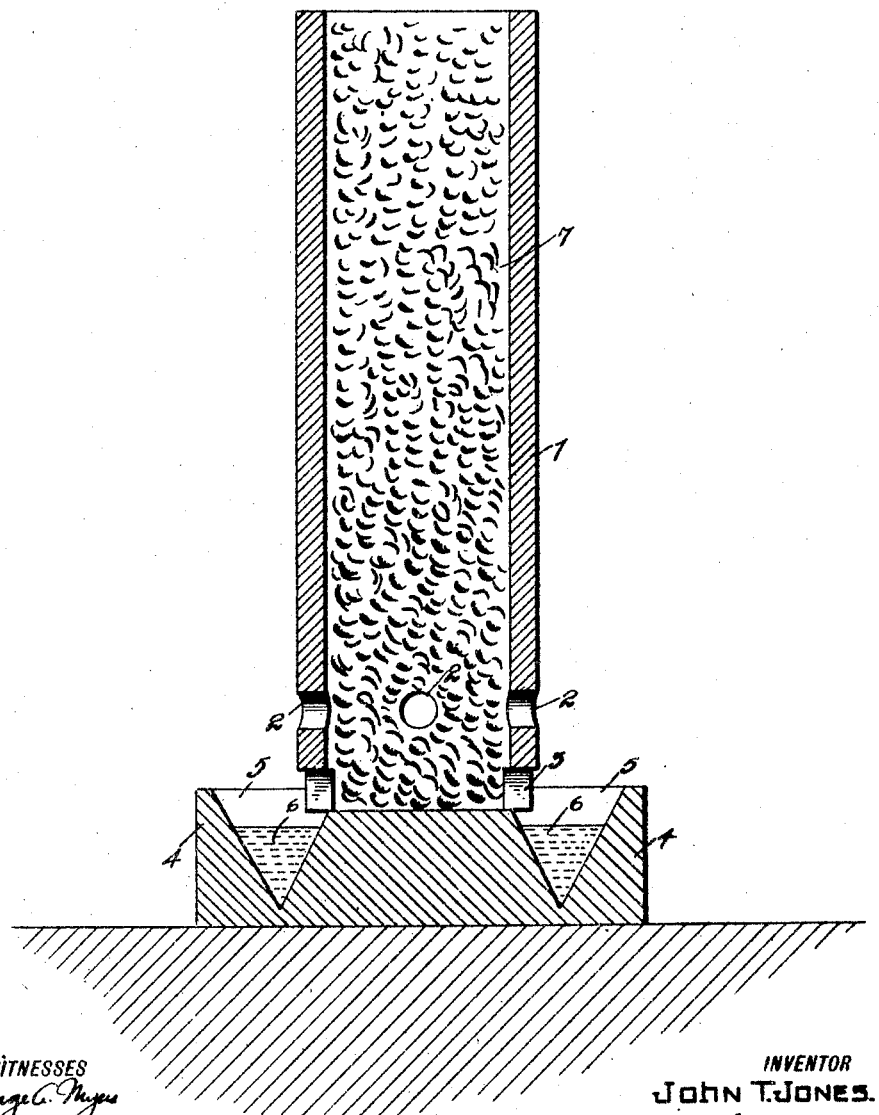

UNITED STATES PATENT OFFICE.

JOHN TYLER JONES, OF PITTSBURGH, PENNSYLVANIA, ASSIGNOR TO THOMAS J. HOWELLS, OF PITTSBURGH, PENNSYLVANIA.

PROCESS OF REDUCING IRON FROM THE ORE.

1,379,024.  Specification of Letters Patent.  Patented May 24, 1921.

Application filed December 20, 1917. Serial No. 208,088.

*To all whom it may concern:*

Be it known that I, JOHN TYLER JONES, a citizen of the United States, and a resident of Pittsburgh, in the county of Allegheny and State of Pennsylvania, have invented certain new and useful Improvements in Processes of Reducing Iron from the Ore, of which the following is a specification.

My invention relates to improvements in processes of reducing iron from the ore, and it consists in the steps hereinafter specified and more particularly pointed out in the appended claims.

An object of my invention is to provide a process which is very economical as compared with the ordinary blast furnace process.

A further object of my invention is to provide a process by means of which not only is a smaller amount of fuel needed for reducing a given amount of iron from its ore, but a portion of the fuel is recovered in the form of coke, of good burning quality.

A further object of my invention is to provide a process for reducing iron from the ore and for recovering the iron in a form which may be more readily handled or shipped.

A further object of my invention is to provide a process for reducing iron from its ore which does not require the use of lime.

Other objects and advantages will appear in the following specification and the novel features of the invention will be particularly pointed out in the appended claims.

My invention is illustrated in the accompanying drawing forming a part of this application, in which a section of a furnace is shown, this furnace being used in one form of the process.

My invention applies to the reduction of any ordinary iron ore. The ore is preferably crushed to a fineness varying from twenty to one hundred mesh. The crushed ore is mixed with coal, preferably bituminous coal, which is crushed to a similar fineness, the proportions of the materials being, for example, one of coal and five of ore.

The mixed charge is heated in a coking oven, as, for instance a Siemens regenerative coking oven, substantially out of the presence of air, to a temperature which is sufficient to metallize the iron and to coke the coal. The time taken to complete the coking process varies in accordance with the charge; thus it may take twenty-four, forty-eight or seventy-two hours, according to the capacity of the furnace. In a small crucible the reduction has been made in a few minutes.

The product is a coked mass containing particles or iron in the form of globules separated by particles of coke. If the temperature is too high or if the heat is long continued the globules may coalesce. This should be prevented if possible, especially where it is designed to separate out the iron magnetically. The red hot material is drawn out of the furnace and cooled with water in precisely the manner that coke is cooled in the coking process. The cooled coked mass is now crushed by means of suitable rolls or in any other suitable manner and the crushed product is treated magnetically to separate the iron. The magnetically separated iron may be shipped in its granular condition or it may be further melted into pigs.

The crushed residue is coke of fine burning quality and can be used as such. I desire to call attention to the fact that the reduction of the iron is largely accomplished by the volatile matter which is given off by the coal, thus leaving coke of marketable quality. This lends greatly to the economy of the process, although it will be noted that there is a relatively small amount of coal used in the initial charge.

In another form of the process equal amounts of coal and ore are mixed and are heated, substantially out of the presence of air, to the coking temperature, and in this instance the iron, instead of being in globular form, is in minute particles hardly visible to the eye, but distributed throughout the mass and separated by particles of coke. In this instance, the coke is a hard firm coke of high quality.

The coked product containing the iron is then placed in a furnace, such as that shown in the drawing. It consists of a vertical chamber 1, open at its top and provided with air openings 2 toward the bottom. Below the air openings are openings 3. The chamber 1 rests on a base 4 which is provided with a trough 5 filled with water 6. The coked mass 7 is fed in at the top of the furnace and the material is continually raked from the bottom of the furnace through the openings 3, into the trough 5.

As the charge descends, additional material, that is to say, coke containing the metallized iron in very minute form, is fed in at the top so that the operation is continuous. In practice, it takes about four hours for the charge to pass through the furnace and out into the trough. During the heating process the iron, which was in a finely divided metallic form, is now brought into the nodular form. The coked product which was cooled by the water is now crushed and the iron is separated magnetically, while the coke may be used for heating purposes, since it is of good burning quality.

I have given two instances of the manner in which the process may be carried out. It is preferable to crush the coal and the ore prior to the coking of the mixture because a greater portion of the metal is obtained and the time is decreased by pulverizing these materials, but I have obtained results, in practice, by using lumps of coal and lumps of ore, although these results are not as good as where the materials are pulverized.

Bituminous coal has been given as an example of a good reducing agent, but any suitable hydrocarbon-bearing material, such as peat and wood or even pure coke, may be used successfully. Obviously, the iron which exists in the coked mass may be gotten from the mass by other means than by magnetic separation.

It will be noted that the process requires much less fuel than the ordinary blast furnace practice. Moreover, a portion of the fuel is recovered as a marketable coke. The temperature at which the process is carried out is also much lower than that in blast furnace practice, the iron produced by this process is of the highest grade.

It will also be noted that the process does not require the use of lime. The ordinary blast furnace process requires substantially one ton of lime to one ton of iron produced. It will be seen that the present process, therefore, is rendered economical by this feature as well as by the fact that a smaller proportion of the reducing agent is necessary in the initial charge than in the ordinary blast furnace practice. In connection with the first example given, I have stated that if the temperature is too high or if the heat is long continued, the globules may coalesce. Not only is this true, but the coke which has been produced may burn off and the iron will come down in the form of a liquid mass. In the appended claims it is stated that the mass is coked, and I regard the process of producing iron in which the mass is coked and the heat is continued to crush the particles of iron and to burn away the coke either in whole or in part as falling within the spirit and scope of the invention.

I claim:

1. The herein described process of reducing iron from its ore, which consists in mixing the ore with coal, heating the mixture out of the presence of a flux and substantially out of the presence of air to coke the coal, and to reduce the iron to the metallic state, crushing the coked mass and separating the iron from the coke magnetically.

2. The herein described process of reducing iron from its ore, which consists in crushing the ore, crushing coal, mixing the crushed ore with the crushed coal in the proportion of one part of coal and five of ore, heating the mixture out of the presence of a flux and substantially out of the presence of air to coke the coal and to reduce the iron to the metallic state, cooling the coked product, crushing the product and separating the iron magnetically from the coke.

3. The herein described process of reducing iron from its ore, which consists in mixing finely divided ore with a finely divided coal, heating the mixture out of the presence of a flux and substantially out of the presence of air, thereby producing a coked mass containing globules of iron separated by particles of coke, cooling the coked mass and separating the iron from the coke.

4. The herein described process of reducing iron from its ore, which consists in mixing finely divided ore with a finely divided coal, heating the mixture out of the presence of a flux and substantially out of the presence of air, thereby producing a coked mass containing globules of iron separated by particles of coke, crushing the coked mass and magnetically separating the iron from the coke.

5. The herein described process of reducing iron from its ore, which consists in mixing ore with a hydrocarbon-bearing material, heating the mixture out of the presence of a flux and substantially out of the presence of air and out of the presence of lime, to bring the iron into the metallized state and to coke the hydrocarbon-bearing material and subsequently separating the iron from the coke.

JOHN TYLER JONES.